Jan. 30, 1968  R. F. MALLINA  3,366,301
INSTRUMENT FOR JOINING BLOOD VESSELS
Filed Sept. 7, 1965  7 Sheets-Sheet 1
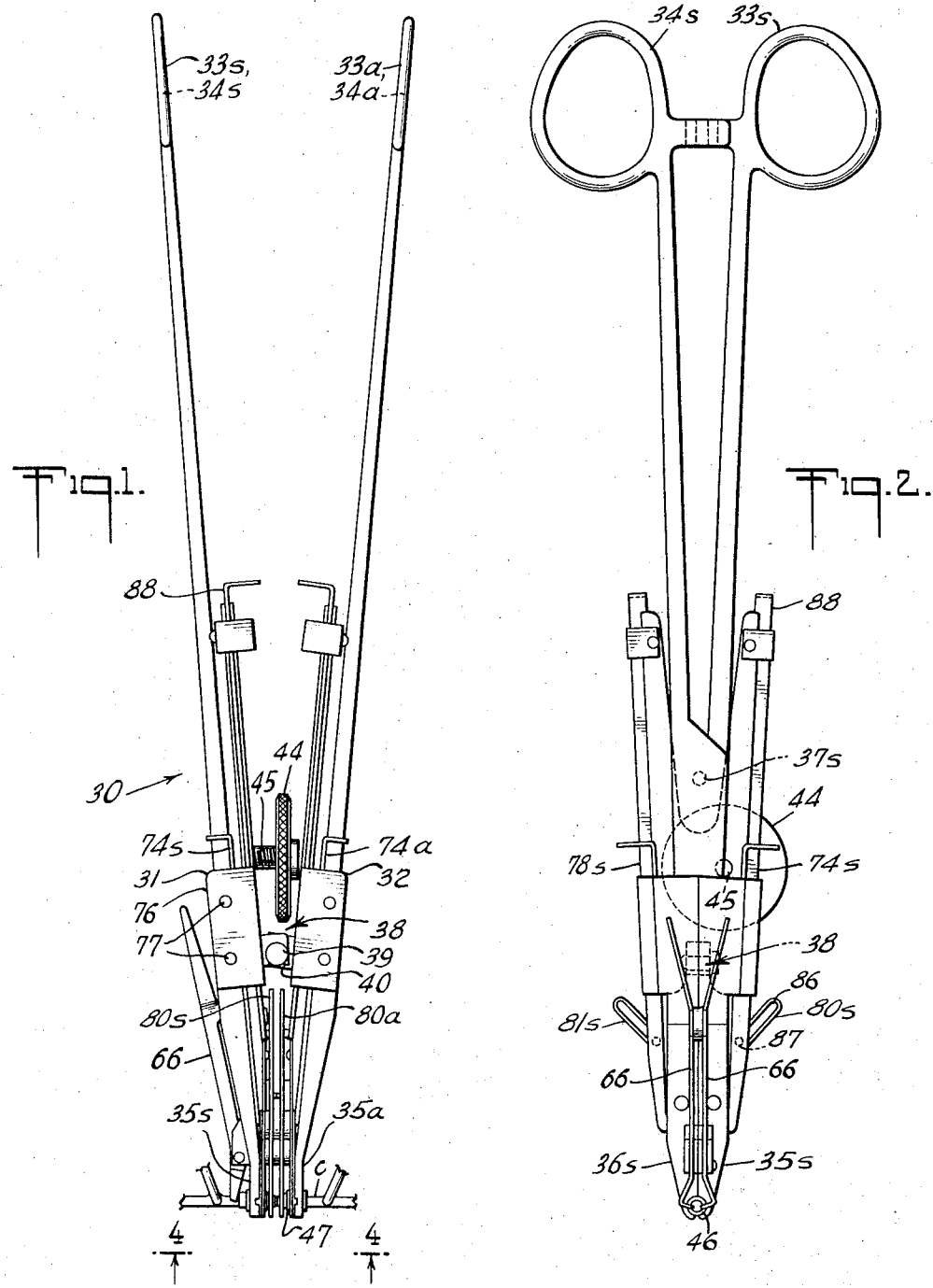
INVENTOR.
RUDOLPH F. MALLINA
BY Robert W. Kell
ATTORNEY Jan. 30, 1968 R. F. MALLINA 3,366,301
INSTRUMENT FOR JOINING BLOOD VESSELS
Filed Sept. 7, 1965 7 Sheets-Sheet 2
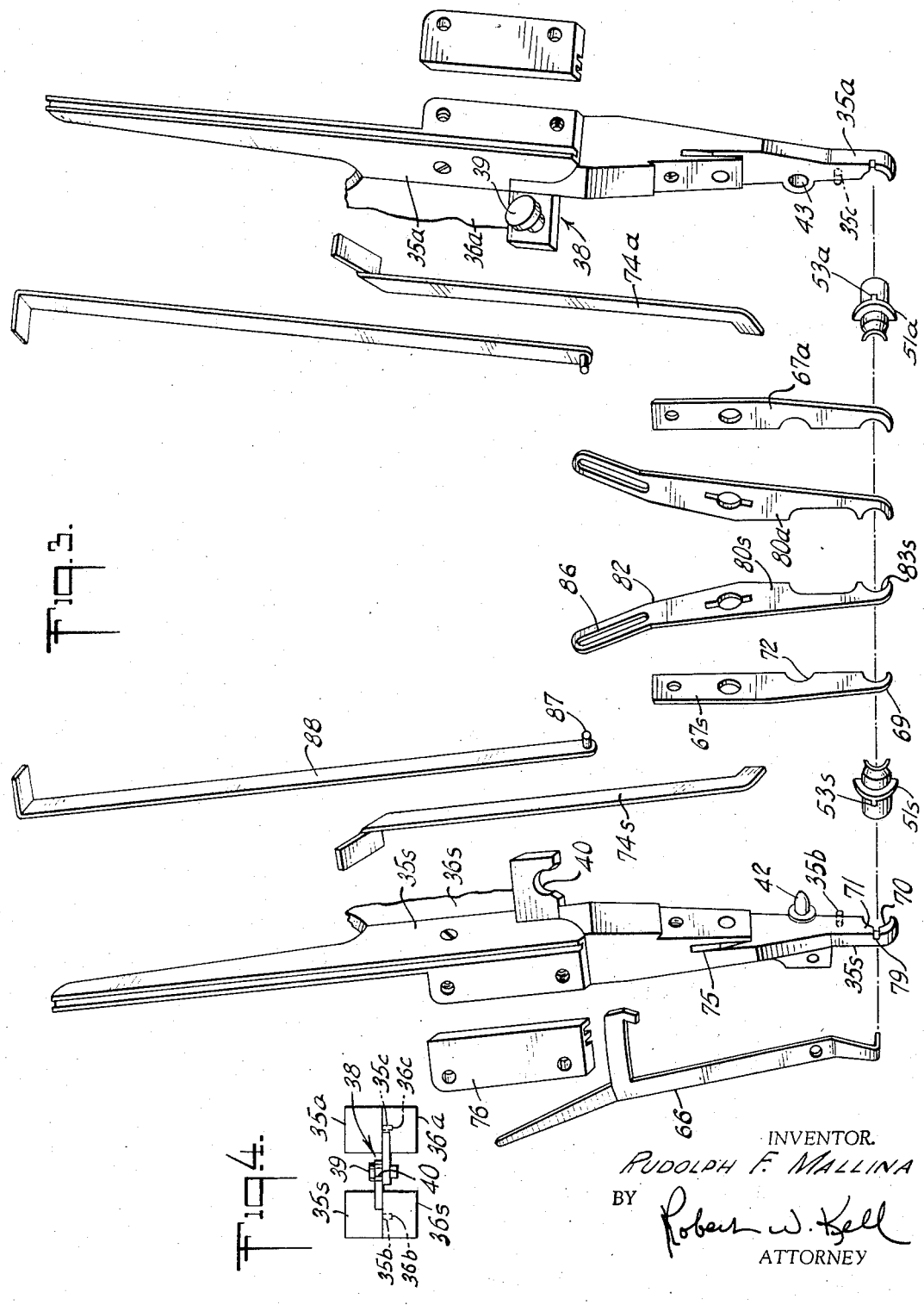
INVENTOR.
RUDOLPH F. MALLINA
BY
ATTORNEY

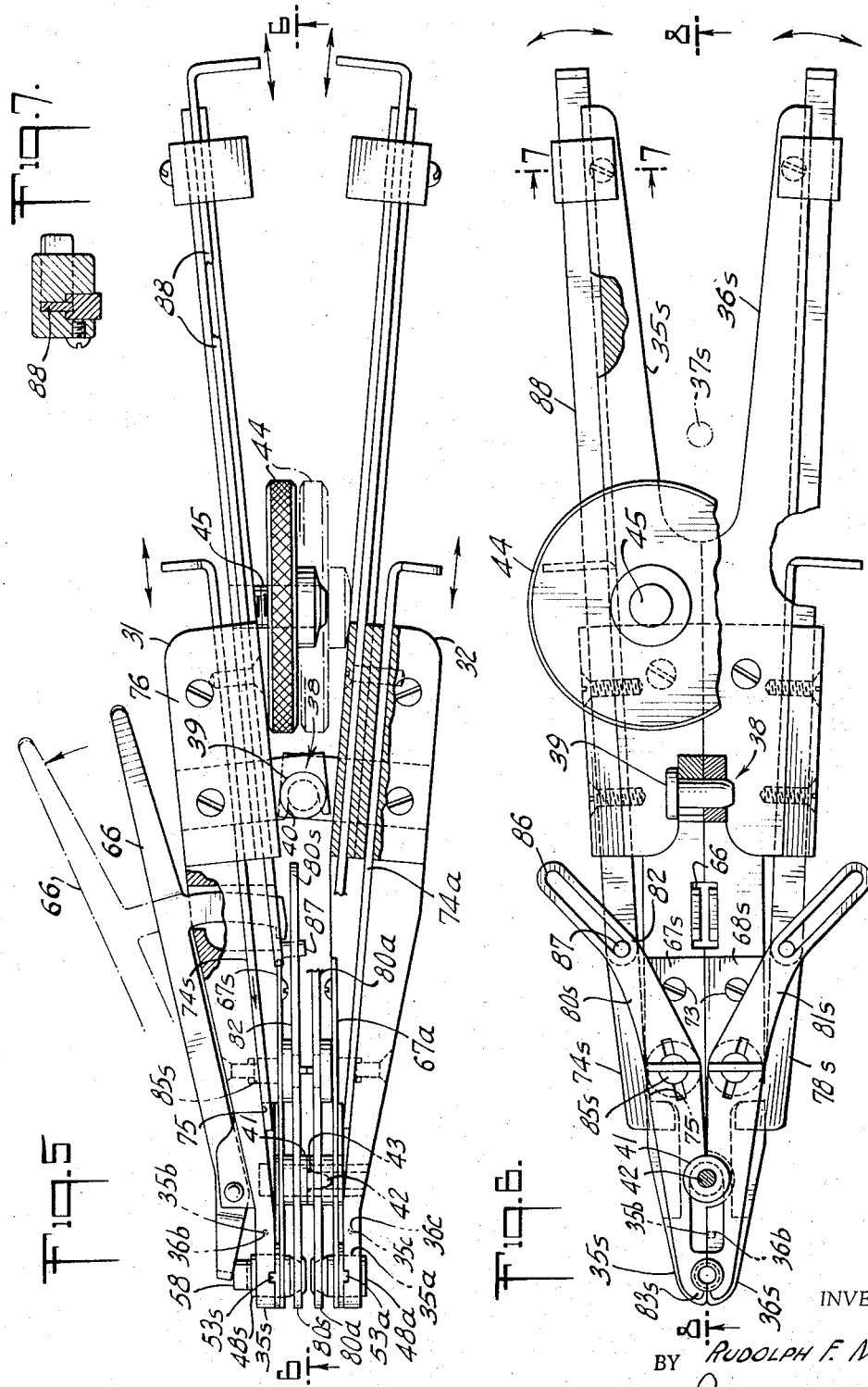

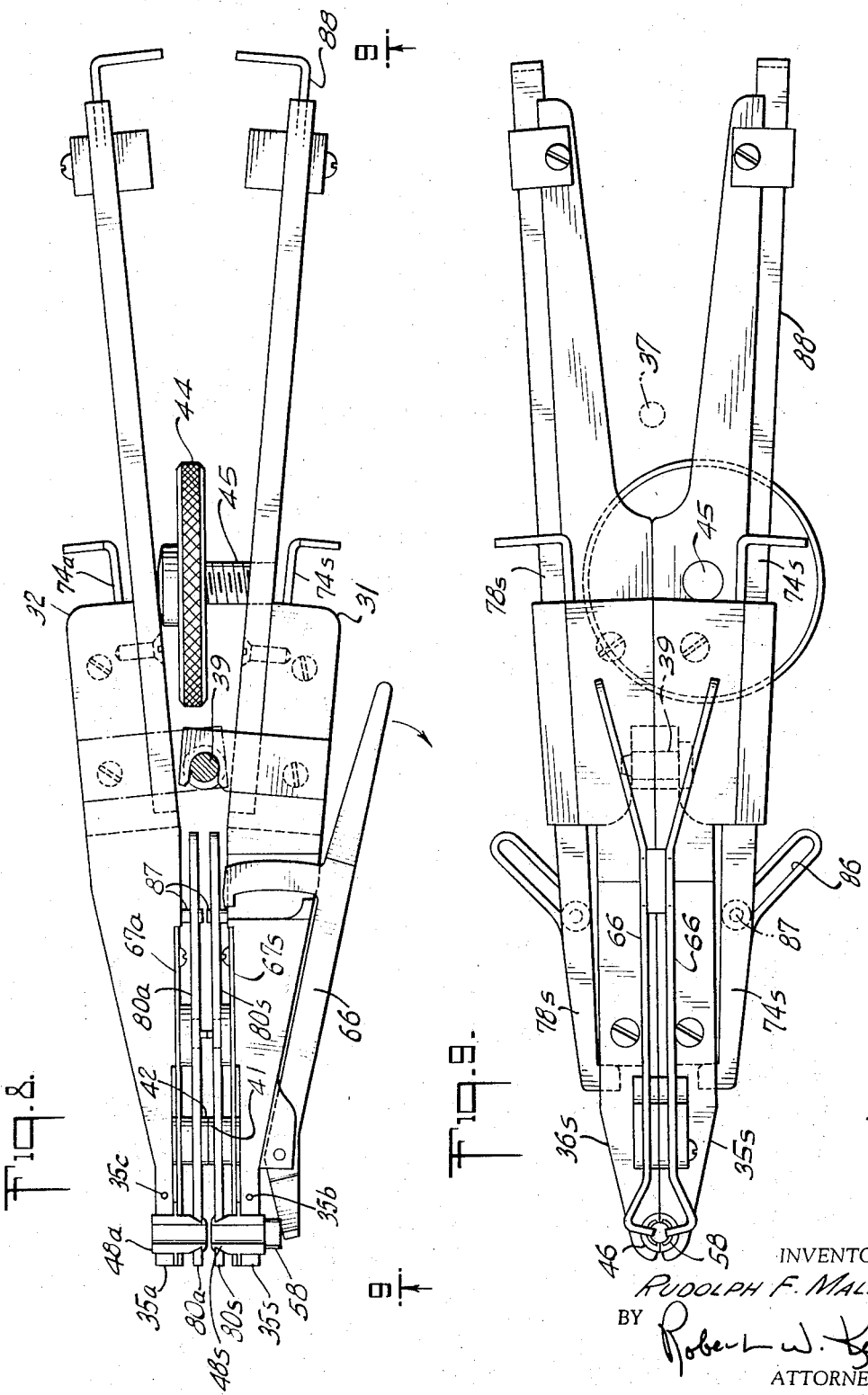

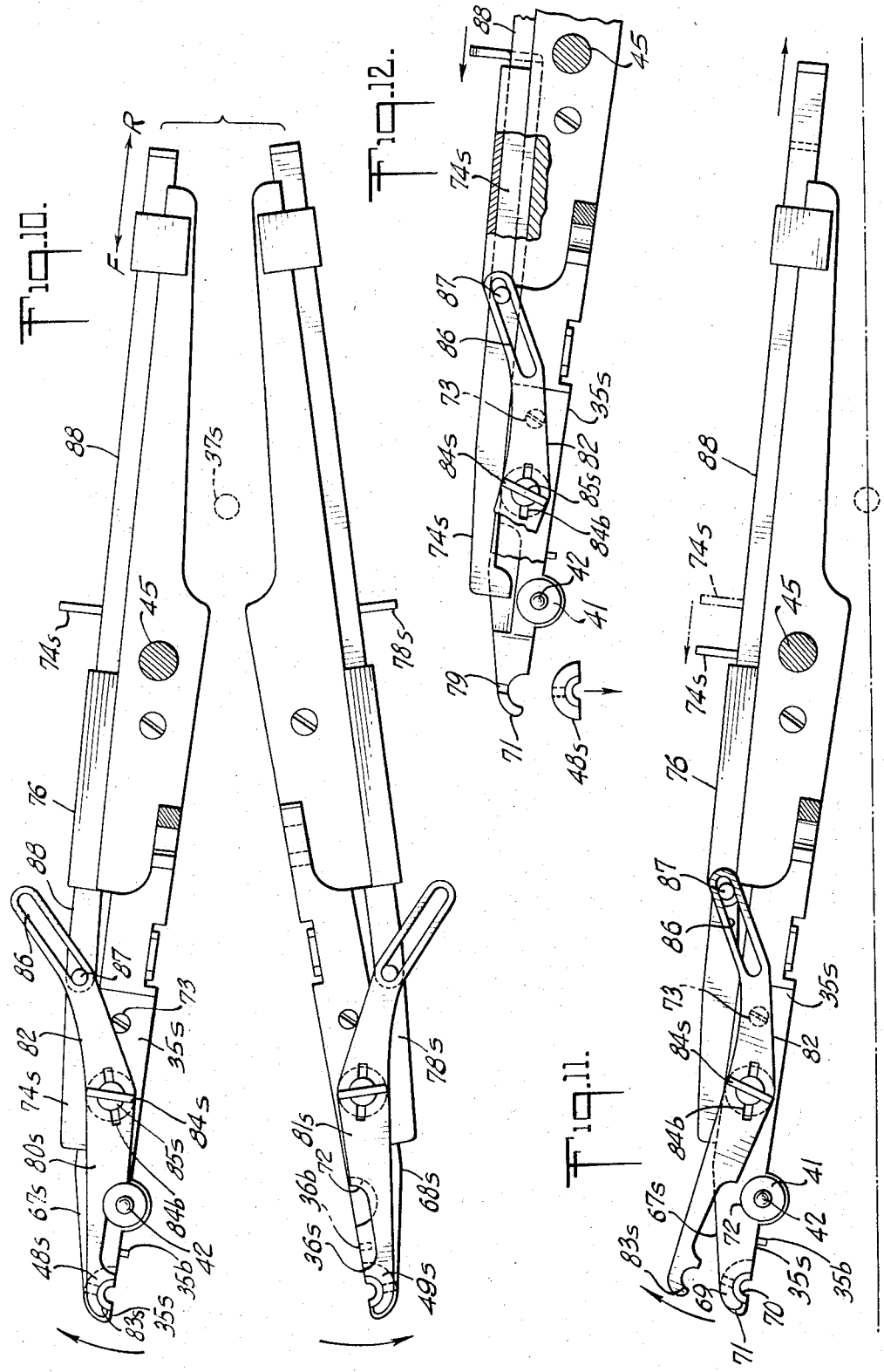

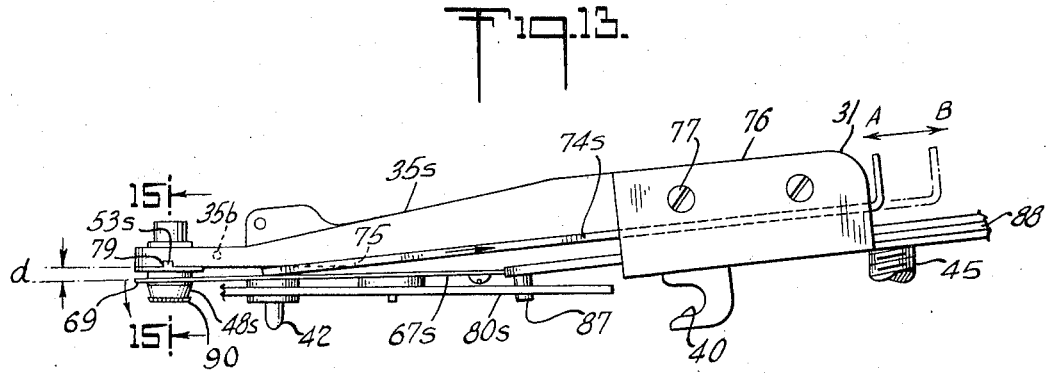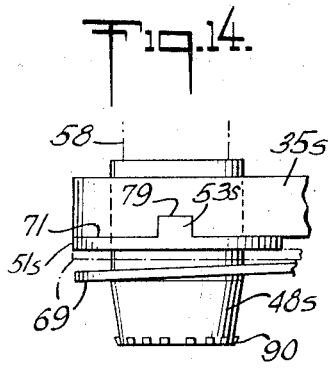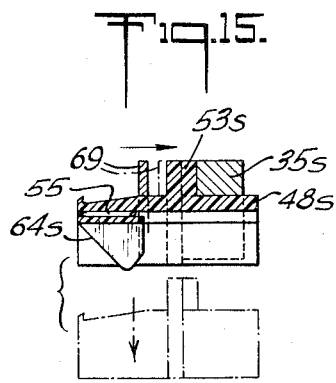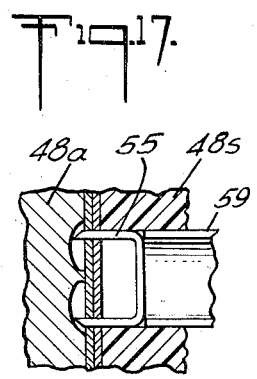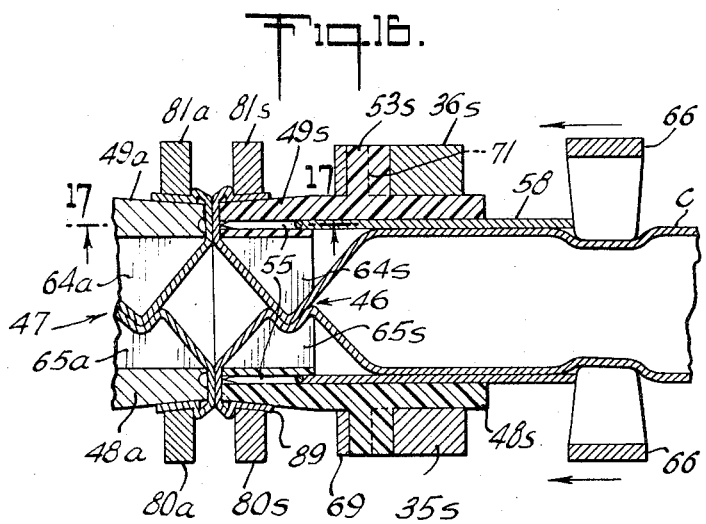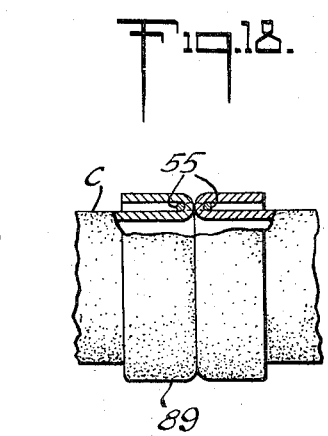

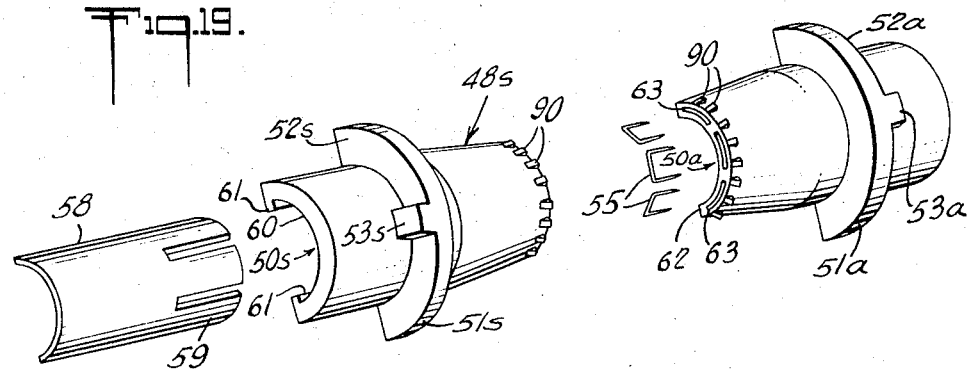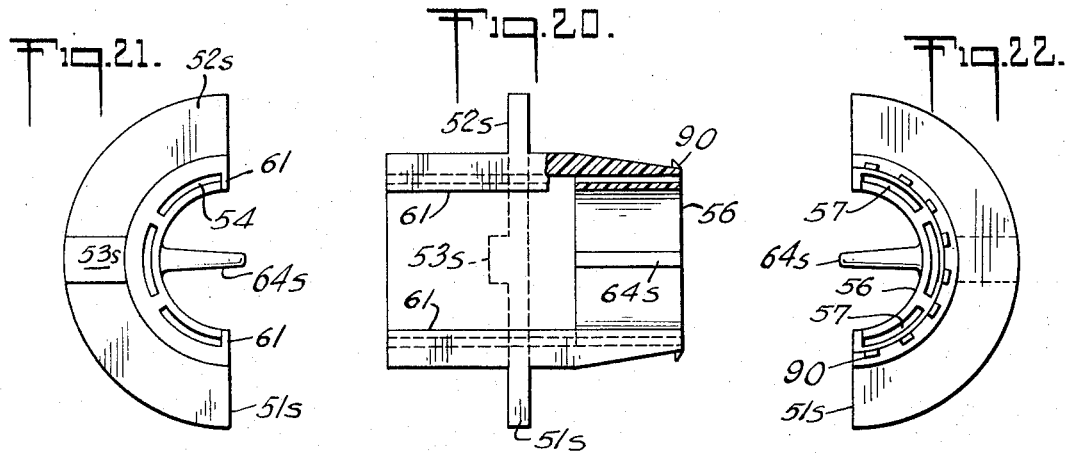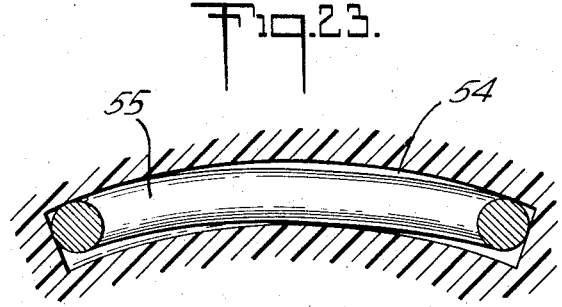

United States Patent Office 3,366,301
Patented Jan. 30, 1968

3,366,301
INSTRUMENT FOR JOINING BLOOD VESSELS
Rudolph F. Mallina, Hastings on Hudson, N.Y., assignor to Codman & Shurtleff, Inc., a corporation of Massachusetts
Filed Sept. 7, 1965, Ser. No. 485,246
7 Claims. (Cl. 227—19)

ABSTRACT OF THE DISCLOSURE

A medical instrument useful in the anastomosis of small blood vessels is constructed in two sections. One end of a blood vessel to be joined is cuffed over a staple bushing held by one section of the instrument, and the other end of the blood vessel is cuffed over an anvil bushing held by the other section of the instrument. The two sections are then coupled together whereby the two cuffed vessel ends are aligned with the intima of the vessel ends in contact. A stapler lever is then actuated to drive staples through the coupled ends.

This invention relates to surgical instruments, and relates more particularly to medical stapling instruments or staplers for the anastomosis of circulatory vessels, such as the joining of blood vessels and similar linear structures such as lymphatics and the like.

The most conventional way of reconnecting a severed blood vessel is by manual suturing, in which the surgeon uses a curved needle with a silk thread attached and held in specially designed forceps to sew the ends of a vessel together for re-establishing therein the flow of blood. In large vessels, this type of anastomosis, however time consuming and demanding of surgical skill, produces a reasonably satisfactory connection between the two vessel ends. For small vessels, however, this type of connection becomes difficult; for very small blood vessels, which may have a diameter of 2 mm. or smaller, suturing of the ends by hand is a difficult and often impossible task.

It is accordingly among the principal objects of the invention to provide a stapler with the aid of which the ends of circulatory vessels may be reconnected safely and reliably, equally well for large, for small, and even for very small vessels.

Reference is made to my U.S. Patent No. 3,144,654 for a detailed description of the various parts of a vascular stapling instrument and the use of such an instrument in the anastomosis of blood vessels.

Reference is also made to my U.S. Patent No. 3,176,896 for a detailed description of bushing parts for use in connection with a stapling instrument.

The use of a mechanical stapling instrument simplifies the end to end anastomosis of blood vessels and offers the advantages over hand suturing of reduced operation time and improved uniformity. One of the most difficult steps in the anastomosis with a stapler is the cuffing of the vessel over the bushing rim. In my Patent No. 3,144,654 referred to above, the cuff is held in position by what might be termed a "universal" cuffing clamp. Only two points of the cuffing clamp hold the cuff on the bushing half. The design of a single cuffing clamp to accommodate all bushing sizes requires a compromise that favors the middle size bushings at the expense of the larger and smaller bushings.

It is an advantage of the present invention that the cuffing clamp contacts the cuffed vessel, not at two points per bushing half, but throughout the entire 180° angle of the bushing half. The design of this improved cuffing clamp is such that it may be easily and quickly mounted on the jaw of the instrument to permit the accommodation of a specific bushing and vessel size. The present invention further provides a cuffing clamp that may be manipulated by the surgeon or his assistant at a distance from the circulatory vessel being repaired. The main purpose for removing the control points toward the rear of the instrument is the fact that during the cuffing of the vessel, the operating surgeon has both hands right over the tip of the instrument. This leaves hardly any room for the assisting surgeon to get his hands in a position so he can open and close the cuffing clamps. This is particularly awkward in deep cavities. Bringing the controls only a few inches back toward the handle allows the assisting surgeon to operate the cuffing clamps with ease and without interferring with the hands of the operating surgeon.

In the vascular stapler described in my issued patent it is necessary to move the stapler section and anvil section of the instrument from an upper plane to a lower plane to couple them. In coupling the instrument to be described herein, the surgeon may confine his coupling motions to a single plane. This improves the ease of coupling and enables the surgeon to see better what he is doing.

The present invention also provides an improved locking means for the bushing parts with relation to the stapler. It is an advantage of the locking means to be described herein that it minimizes the obstruction of the surgeon's view and facilitates the anastomosis of very small blood vessels.

In the accompanying drawings:

FIGURE 1 is a plan view of a medical stapling instrument in accordance with the invention, showing the stapling section and the anvil section of the instrument with a circulatory vessel positioned for stapling;

FIG. 2 is a side elevation of FIG. 1 viewed in the direction of the stapling section, though without vessel;

FIG. 3 is an exploded view of parts of the medical stapler in perspective;

FIG. 4 is a diagrammatic representation of the medical instrument as seen in the direction 4—4 of FIG. 1 and shows the relative position of the principal parts thereof, other parts being deleted for clarity;

FIG. 5 is a top plan view of the two sections of the stapler shown in FIG. 1 in operative relationship;

FIG. 6 is a horizontal cross-section taken on the line 6—6 of FIG. 5, showing the stapling section of the instrument;

FIG. 7 is an enlarged vertical detail section taken on the line 7—7 of FIG. 6;

FIG. 8 is an inverted plan view taken on the line 8—8 of FIG. 6 showing both the stapling and anvil sections;

FIG. 9 is an elevation of FIG. 8 viewed in the direction 9—9;

FIG. 10 is a view similar to FIG. 6 with the jaws of the stapling section in open position;

FIG. 11 is a view similar to FIG. 10 showing only the upper half thereof and the cuffing lever in open position;

FIG. 12 is a detailed fragmentary view of the stapling section shown in FIG. 11 with portions broken away to show the bushing release mechanism;

FIG. 13 is a top plan view of the stapling section illustrated in FIG. 12;

FIG. 14 is an enlarged fragmentary view of a portion of FIG. 13;

FIG. 15 is an enlarged section taken on the line 15—15 of FIG. 13;

FIG. 16 is a fragmentary large scale elevation view partly in section, showing two vessel ends about to be stapled;

FIG. 17 is a fragmentary large scale developed view in section on the line 17—17 of FIG. 16;

FIG. 18 is a fragmentary large scale elevational view partly in section, showing two stapled vessel ends;

FIG. 19 is an extended view, in perspective of one staple bushing part with staples and a staple driver, and one anvil bushing part;

FIG. 20 is an interior view of a bushing half;

FIG. 21 is an end elevation of FIG. 20 as seen from the left;

FIG. 22 is a view similar to FIG. 21 looking from the right; and,

FIG. 23 is a fragmentary large scale sectional view of a staple positioned in a bushing.

THE STAPLER—GENERAL DESCRIPTION

The embodiment of this invention which has been selected for description in this specification is illustrated in the accompanying drawings, and particularly in FIGS. 1, 2 and 4 which show a medical stapling instrument or stapler 30 having two sections, namely a stapler section 31 and an anvil section 32. It will be noted that the stapler section 31 comprises a pair of forceps having two releasably interengaging handles $33s$, $34s$ and jaws $35s$, $36s$ pivoted at $37s$. As best shown in FIG. 10, a register pin $35b$ on the jaw $35s$ and an aperture $36b$ on the jaw $36s$ are provided for locating and properly positioning the jaws relative to each other when in the closed position. The anvil section comprises a pair of forceps having releasably interengaging handles $33a$ and $34a$ and jaws $35a$, $36a$ corresponding to jaws $35s$ and $36s$. A register pin $35c$ on the jaw $35a$ and an aperture $36c$ on the jaw $36a$ are provided for locating and properly positioning the jaws relative to each other when in the closed position (see FIG. 2). The relative position of each pair of forceps when the stapler section 31 is joined to the anvil section 32 is illustrated in FIG. 4.

The foregoing and some other parts mentioned subsequently herein are either identical with, or similar to corresponding parts in the aforesaid earlier patents, No. 3,144,654 and No. 3,176,896; and wherever the discussion of these parts in the said earlier applications is more detailed than herein, such fuller discussion is incorporated herein by reference.

The stapler section 31 is releasably engaged with the anvil section 32 by hinge means 38 consisting of a headed pin 39 and a slot 40 shaped to receive releasably the pin 39. The pin 39 is rotatable relative to the slot 40 when inserted therein. As best shown in FIGS. 5 and 13, registry means 41 are provided for locating and properly positioning the front parts of the sections 31 and 32 relative to each other, and may include a register pin 42 on the one section and an aperture 43 on the other.

The two sections will be separate from each other during cleaning, sterilizing and mounting of the ends of a circulatory vessel such as a blood vessel, but after each vessel end is engaged on a section, the surgeon or other operator, as more fully explained below, will interengage the sections 31 and 32 by the hinge means 38 before proceeding with the actual stapling.

Adjustable means are provided, such as a nut 44 and screw 45, for adjusting the force with which the two front ends of the sections 31 and 32 are pressed together, in order to regulate the pressure with which the parts of the vessel to be stapled are held in contact.

THE BUSHINGS

Each section of the instrument carries a bushing. The stapler section 31 carries a stapler bushing 46, and the anvil section 32 an anvil bushing 47.

Thus, as shown in FIGS. 8, 10 and 16, there is disposed in the upper jaw $35s$ of the stapler section 31 an upper staple bushing-half $48s$, and in the lower jaw $36s$ of the stapler section 31 there is disposed lower stapler bushing-half $49s$. Similarly, in the upper jaw $35a$ of the anvil section 32 there is disposed an upper anvil bushing-half $48a$ and in the lower jaw $36a$ there is disposed a lower anvil bushing-half $49a$. The pair of upper and lower bushing-halves $48s$ and $49s$, and the pair of bushing-halves $48a$ and $49a$, each completes in its section a bushing; thus the bushing-halves $48s$ and $49s$ complete the staple bushing 46, and the bushing-halves $48a$ and $49a$ complete the anvil bushing 47.

As best shown in FIGS. 19–22 each staple bushing-half has an internal cavity $50s$ and has on its exterior surface a flange $51s$ having on one face $52s$ thereof a projection $53s$ which may be molded integral with the bushing. Each staple bushing-half has on its interior one or more receptacles 54, each having staples 55. The receptacle intersects the front face 56 of the bushing-half in an arcuate aperture or apertures 57 which form the staple exit port or ports. A staple driver 58 is provided which has two or more fingers 59 reaching into each receptacle 54 to expel the staples 55 out of the respective ports 57. The driver 58, of the upper bushing-half $48s$, is retained between the curved inner surface 60 of the bushing-half $48s$ and the guide rails 61 thereof, while the fingers 59 will protrude with their forward portions into the receptacles 54.

The anvil bushing-halves have an internal cavity $50a$ and on their exterior surface a flange $51a$ having on one face $52a$ thereof a projection $53a$. Each anvil bushing-half is provided at its front face 62 with a hard surface in which the clinching grooves 63 are formed.

Each bushing 46 and 47 when assembled for stapling has an interior passage for one end of a circulatory vessel defined by the inner curved surface 60 of the cavities $50s$ and $50a$. An upper clamp tooth $64s$ and lower clamp tooth $65s$ within the interior passage of the staple bushing have a serrated surface defining therebetween an undulating path in which there is clamped a portion of a vessel C (see FIG. 16). Each of the clamp teeth $64s$ and $65s$ is molded in one piece with its respective bushing part. While the upper stapler bushing part $48s$ generally is exactly like the lower part $49s$, the exception is that the clamp tooth $64s$ of the upper part is complementary, rather than symmetrical, relative to the clamp tooth $65s$ of the lower bushing part. The same may be said about the parts of the anvil bushing 47; namely, the upper and lower parts are alike except for their respective clamp teeth $64a$ and $65a$.

As best shown in FIG. 5, the stapler section 31 includes a staple lever 66 for propelling the staple driver 60.

LATCHING MEANS

Means are provided, such as a locking device connected to each jaw, for locking the respective bushing part. Thus the upper jaw $35s$ of the upper bushing-half $48s$ comprises a locking device $67s$ and the lower jaw $36s$ a locking device $68s$ (see FIG. 10).

As best shown in FIGS. 11–15 on the upper jaw $35s$ there is mounted a flat spring $67s$ one end 69 of which is shaped to correspond with the bore 70 of the bearing surface 71. This spring has a circular opening 72 dimension to clear the registration means 41 and is secured to the jaw $35s$ by the screw 73. In the closed position the end 69 of the spring $67s$ is parallel to the bearing surface 71 of the jaw $35s$ but spaced therefrom a distance slightly less than the width of the bushing flange.

A bushing slide $74s$ is slideably mounted in a slot 75 and retained in positon by a cover plate 76 fastened to the jaw $35s$ by two screws 77.

A bushing slide $78s$ is similarly mounted on the lower stapler jaw $36s$. The operation of the locking device on each jaw is similar and will be understood from the following description of the operation of the bushing slide $74s$.

With reference to FIG. 13, bushing slide $74s$ is moveable in the direction of the arrow A wedging itself between the jaw $35s$ and spring $67s$ thereby lifting it a distance d from the bearing surface, and releasing the bushing $48s$ from the jaw $35s$. The movement of the bushing slide in the direction B, the position indicated in dotted lines, releases the spring 67s which moves to the position indicated by the dotted lines (FIG. 14), thereby locking the bushing in place. It will be noted that when the bushing 48s is thus secured in the jaw 35s, the projection 53s on the flange of the bushing is registered with a recess 79 in the bearing surface 71 of the jaw 35s.

In a similar manner the bushing slides 74a and 78a operate to lock the anvil bushing-halves 48a and 49a in the jaws 35a and 36a, respectively, of the anvil section 32.

THE CUFFING CLAMP

Two cuffing clamps 80s and 81s are provided for the staple bushing 46 and two cuffing clamps 80a and 81a are provided for the anvil bushing 47. The operation of each of these cuffing clamps will be understood with reference to FIGS. 10, 11 and 12 and the description of the clamp 80s that follows.

The cuffing clamp 80s comprises a lever 82 and a front portion that has an edge 83s that complements the exterior surface of the bushing 48s. The edge 83s may be serrated if desired. The cuffing clamp 80s is mounted on the jaw 35s by a bayonet type mounting consisting of a pivot 85s and a bar 84s that extends beyond the circumference of the pivot. This permits rapid mounting of the cuffing clamp on the jaw by an axial and rotary motion; first aligning a slot 84b in the cuffing clamp with the bar 84s. When mounted on the jaw 35s the top surface of the cuffing clamp is engaged by the lower surface of the bar 84s, and a slot 86 in the back portion of the cuffing clamp engages a pin 87. The pin 87 may be moved by a cuffing slide 88 mounted in a channel on the jaw 35s by a retainer of well known conventional construction shown in FIG. 7. At that end of the cuffing slide most remote from the pin 87, there is a handle. That end of the cuffing slide nearest to the pin is retained by the same cover plate 76 that retains the bushing slide 74s referred to above in describing the latching means. The cuffing slide 88 is moveable by its handle in opposite directions R and F between a rearward and forward position (the forward position being shown in FIG. 10 and the rearward position in FIG. 11). Moving the slide to its rearward position opens the cuffing clamp and removes it from the immediate field of the vessel, thereby permitting the surgeon to freely manipulate the vessel and form a cuff on the bushing. The cuffing slide may then be moved to its forward position closing the cuffing clamp to contact the cuffed vessel, and hold it in place against the bushing.

MATERIALS

The material of the bushing parts 48s and 49s is preferably a non-metallic molded material, for instance a crystalline thermoplastic acetal resin having a high melting point and known under the trademark "Delrin," or other heat and chemically stable material. The entire anvil bushing 47 may be made of metal such as stainless steel or other hard material, for instance glass. It also may be a metal coated plastic.

The staple driver 58 may be made of stainless steel or a cobalt chromium known under the trademark "Vitalium." Likewise, the parts of the forceps as well as the stapling lever 66 and the cuffing clamp may be made of stainless steel or "Vitalium" or of some similar biologically inert material.

THE OPERATION OF THE MEDICAL STAPLER

Each bushing-half is positioned in its respective open jaw of the forceps, and is locked in position by moving the cam levers, 74s, 74a, 78s and 78a, in the direction B to the rearwardmost position indicated in dotted lines in FIG. 13. Thereafter, one of the severed ends of the vessel C is introduced between the two halves 48s, 49s of one bushing 46, and the other end between the two halves 48a, 49a of the other bushing 47.

Then the surgeon will close the jaws of the stapler section and the anvil section by bringing together and interlocking the handles of each section. By this closing, each of the two bushing-halves will complete the respective bushing, and the vessel clamping means, 64s, 65s and 64a, 65a, thereof will clamp a portion of the vessel, as shown in FIG. 16.

Thereafter the vessel end will be turned over the bushing as illustrated in FIG. 16 to form a cuff 89, the vessel being retained on the bushing by the teeth 90. Subsequently, the cuffing clamps 80s, 81s, 80a, 81a are applied.

Thereafter the two sections 31 and 32 are coupled together by the hinge means 38 and registered with the registering means 41; the force between the two cuffed vessel ends being adjusted by means of the adjustable nut 44.

The surgeon will now apply the staple lever 66, so that the staples 55 will be driven through the adjoining cuffed vessel ends.

Thereafter the operator will open the cuffing clamps, release the bushings 48s, 49s, 48a, 49a from the jaws 35s, 36s, 35a, 36a, and spread apart the handles 33s, 34s, and 33a, 34a. When the jaws have been opened and the stapling instrument removed the cuffs may be turned back and the bushing-halves removed from the site of the anastomosis. The joined blood vessel ends are shown in FIG. 18.

I wish it to be understood that I do not desire to be limited to the exact details of construction shown and described, for obvious modifications will occur to a person skilled in the art.

What is claimed is:

1. In a suturing stapler having forcep means, in combination, two bushings each comprising two opposite parts positionable on the forceps means and defining on its interior a central passage for one end of a severed circulatory vessel, means operable for holding releasably each severed end of the vessel cuffed over a bushing comprising two cuffing clamps for each bushing operable to engage the cuff on opposite sides of the outer bushing surface, each cuffing clamp having a cuff engaging edge at one end thereof, and being pivoted on the forceps means about a fulcrum, the other end of each cuffing clamp extending beyond the fulcrum and having a slot therein that defines an angle with respect to the axis of the forceps; a pin engaging said slot, said pin being mounted at one end of a slide that is moveable in a direction parallel to the principal axis of the forceps and extends a substantial distance back from the cuffing clamp thereby permitting manipulation of the slide and rotation of the cuffing clamp about the fulcrum to move the cuff engaging edge with respect to the bushing from a point that is remote from the cuffing clamp.

2. A suturing stapler according to claim 1 wherein the cuff engaging edge of each cuffing clamp is serrated.

3. A suturing stapler according to claim 1 wherein the cuffing clamps are secured to the forceps means by a bayonet type mounting.

4. A suturing stapler according to claim 1 wherein the cuff engaging edge and bushing surface are semi-circular and complementary.

5. A suturing stapler according to claim 1 wherein the cuffing clamps engage the cuff over 180° of arc.

6. In a medical stapler, the combination of a stapler section and an anvil section, hinge means between said sections operable for removably interengaging said sections in registry for performing suturing stapling, each section including a releasably closed bearing structure, two semi-cylindrical staple bushing-halves removably disposed in registry in the bearing structure of the anvil section, the bushing-halves in the bearing structure of each section completing a cylindrical bushing; each bushing-half having a centrally located semi-circular flange carrying a projection on one side thereof, each bearing structure defining two opposite recesses, that receive said projection for positioning the bushing-halves thereof in registry with the flanges against the surfaces of each bearing structure to complete the bushing; latching means secured to each section operable for releasably engaging said flange and pressing it against the surface of the bearing structure, thereby securing the bushing-half thereof in the bearing structure, comprising a flat spring having a semi-circular flange engaging section at one end positioned to exert pressure against the flange and a wedge form slid engaging said spring, said wedge form slide being movable in one direction to lift the spring from the flange and release the bushing and said wedge form slide being movable in another direction to lower the spring on the flange thereby securing the bushing-half in the bearing structure.

7. The medical stapler of claim 6 wherein said hinge means comprises a pair of brackets affixed to said stapler and anvil sections; one of said brackets supporting a headed pin; the other of said brackets having a slot therein adapted to releasably engage said pin.

References Cited
UNITED STATES PATENTS

| | | |
|---|---|---|
| 2,965,900 | 12/1960 | Inokouchi. |
| 3,144,654 | 8/1964 | Mallina et al. _____ 227—19 |
| 3,176,896 | 4/1965 | Mallina _____ 227—19 |

GRANVILLE Y. CUSTER, JR., *Primary Examiner.*